Figure 1:
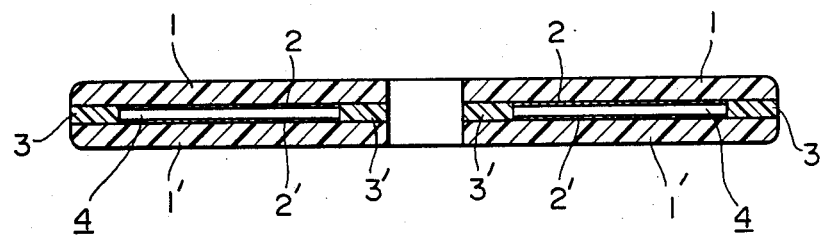

United States Patent [19]

Omae et al.

[11] Patent Number: 4,720,715

[45] Date of Patent: Jan. 19, 1988

[54] OPTICAL DISC STRUCTURE HAVING AN AIR SANDWICH STRUCTURE

[75] Inventors: Fujio Ōmae, Iwakuni; Masahiro Yamada, Ohtake, both of Japan

[73] Assignee: Mitsui Petrochemical Industries, Ltd., Tokyo, Japan

[21] Appl. No.: 7,610

[22] Filed: Jan. 28, 1987

[30] Foreign Application Priority Data

Jan. 28, 1986 [JP] Japan .................................. 61-14761
Jan. 30, 1986 [JP] Japan .................................. 61-16839

[51] Int. Cl.$^4$ ............................ G01D 9/00; C08F 4/68
[52] U.S. Cl. .................................. 346/135.1; 346/137; 526/169.2; 526/281
[58] Field of Search ..................... 346/135.1, 137, 138, 346/76 L; 358/297; 526/169.2, 281

[56] References Cited

U.S. PATENT DOCUMENTS 4,449,138 3/1984 Ando ............................... 346/135.1
4,614,778 9/1986 Kajiura ............................... 526/281

Primary Examiner—E. A. Goldberg
Assistant Examiner—Mark Reinhart
Attorney, Agent, or Firm—Sherman & Shalloway

[57] ABSTRACT

In an optical disc structure for information recording comprising two discs in the form of an annular coaxial plate having optical recording thin layers of one surface thereof, the discs being melt-adhered by ultrasonication via annular coaxial sealing members composed of an outer annular spacer and an inner annular spacer to form an air sandwich structure so that the optical recording thin layers face each other through an air space, provided that one of the optical recording thin layers may be omitted.

The sealing members and said discs are formed of a copolymer of ethylene. The ethylene copolymer forming the sealing members has an ethylene content (a) of 55 to 80 mole % and the ethylene copolymer forming the discs has an ethylene content (b) of 50 to 70 mole %, where (a) is larger than (b).

3 Claims, 1 Drawing Figure

OPTICAL DISC STRUCTURE HAVING AN AIR SANDWICH STRUCTURE

This invention relates to an improvement in an optical disc structure for information recording having an air sandwich structure. More specifically, it relates to an improved optical disc structure of the sandwich structure which is excellent in various properties such as thermal resistance, moisture or water resistance, chemical resistance, moldability, dimensional accuracy and optical properties and is not likely to undergo undesirable changes in optical properties such as an increase in birefringence owing to ultrasonic melt-adhesion (or welding).

The present invention specifically provides, in an optical disc structure for information recording comprising two discs in the form of an annular coaxial plate having optical recording thin layers on one surface thereof, said discs being melt-adhered by ultrasonication via annular coaxial sealing members composed of an outer annular spacer and an inner annular spacer to form an air sandwich structure so that the optical recording thin layers face each other through an air space, provided that one of the optical recording thin layers may be omitted, an improvement wherein (I) said sealing members and said discs are formed of a copolymer of ethylene with a comonomer represented by the following formula (1)

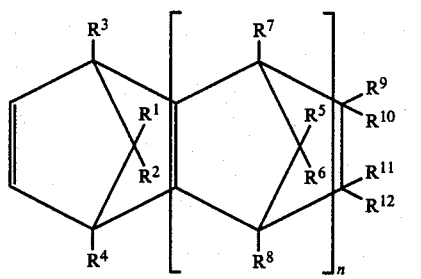

wherein $R^1$ to $R^{12}$, independently from each other, represent a member selected from the class consisting of a hydrogen atom, halogen atoms and $C_1$-$C_4$ alkyl groups, $R^9$ or $R^{10}$ may be bonded to $R^{11}$ or $R^{12}$ to form a trimethylene or tetramethylene group, n represents zero or a positive number of 1, 2 or 3, and when n represents 2 or 3, two or three of each of $R^5$ to $R^8$ groups may be identical or different, and the comonomer of formula (1) forms units of the following formula (2) in the copolymer

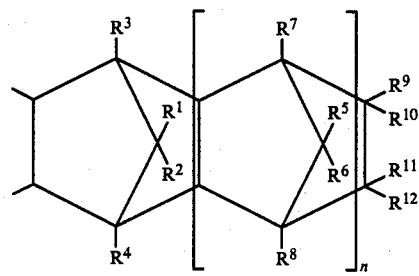

wherein $R^1$ to $R^{12}$ and n are as defined above, and (II) the ethylene copolymer (A) forming said sealing members has an ethylene content (a) of 55 to 80 mole %, preferably 65 to 75 mole %, the ethylene copolymer (B) forming the discs has an ethylene content (b) of 50 to 70 mole %, preferably 55 to 65 mole %, and (a)>(b), preferably (a)≧(b)+5.

Optical disc structures for information recording having an air sandwich structure and similar modified structures having the same basic structure have generally been known in the past.

One example of the basic structure of such an optical disc structure in cross section is shown in FIG. 1 of the accompanying drawing. As shown in FIG. 1, the optical disc structure comprises two discs 1,1' in the form of an annular coaxial plate having optical recording thin layers 2,2' on one surface, the discs being bonded, for example, by an adhesive or ultrasonication, via annular coaxial sealing members composed of an outer annular spacer 3 and an inner annular spacer 3' to form an air sandwich structure so that the optical recording thin layers face each other through an air space (or air gap) 4.

The present invention pertains to an improvement in an optical information recording disc structure having the above basic air sandwich structure obtained by melt-adhesion induced by ultrasonication, and a similar disc structure.

One example of the optical information recording disc structure having an air sandwich structure is known from U.S. Pat. No. 4,074,282. This patent discloses a record structure for recording with a radiation beam which uses a transparent disc or drum, a coaxial backing disc or drum and two coaxial resilient ring-shaped seals to provide an enclosure between the discs or drums. The patent teaches that radiation-sensitive recording material on the side of the disc or drum within the enclosure is thereby protected from ambient dust particles and other contaminations, while the gaseous or solid by-products of the interaction between the recording material and the radiation beam in the area around which the beam impinges are substantially contained between the disc surfaces and cannot produce deposits on an objective lens used to focus the radiation beam or poison the user. The patent, however, totally fails to describe or suggest the use of an ethylene copolymer which meets the requirements (I) and (II) specified with regard to the optical disc structure of the present invention. Furthermore, in the structure proposed in this patent, the use of the resilient annular coaxial sealing members is essential, and the patent does not at all suggest the possibility of using the ethylene copolymer meeting the requirements (I) and (II) of the invention which is a non-elastomeric material and quite differs from such an elastomeric material.

Another optical disc structure for information recording having an air sandwich structure is proposed in Japanese Laid-Open Patent Publication No. 138750/1985 (laid-open on July 23, 1985). This patent document teaches that the sealing members and the discs are bonded by melt adhesion induced by ultrasonication. The patent document, however, quite fails to describe or suggest the use of the ethylene copolymer meeting the requirements (I) and (II) specified in the optical disc structure of the invention.

The prior art references cited above in regard to the conventional optical information recording disc structures having an air sandwich structure do not particularly refer to the selection of resins of which the sealing members and discs are made. Generally, methyl methacrylate resins, polycarbonates, styrene resins, rigid vinyl chloride resins, epoxy resins, and glass have been known heretofore as such a material.

These materials for use in the optical disc structure have their own advantages and disadvantages and have not proved to give entirely satisfactory results. For example, poly(methyl methacrylate) has poor thermal resistance as shown by its heat distortion temperature of about 100° C. and has a water absorption of as high as 0.4%. Hence, it tends to undergo dimensional change by moisture absorption and develop warping. Polycarbonate has good thermal resistance, but has a high photoelastic constant and a large birefringence. Furthermore, the polycarbonate has a low surface hardness and is liable to undergo injury. Furthermore, it has a water absorption of 0.15% and still has a problem of moisture resistance although the water absorption is lower than poly(methyl methacrylate). Polystyrene has inferior thermal resistance, impact strength and surface hardness, and since its birefringence after molding is high, it cannot virtually be used as a material for optical discs. Polyvinyl chloride has very low thermal resistance and poor processability and durability, and is difficult to use as a material for optical discs. The epoxy resins have excellent thermal resistance, but since their moldability is poor, molded articles cannot be obtained on a mass-production basis. In addition, they have a high photoelastic constant, and owing to residual stresses at the time of molding, the resulting articles have a high birefringence. Glass has excellent thermal resistance, moisture resistance and surface hardness, but since it is brittle and easily breakable and heavy, its handlability and producibility are low.

We made investigations on optical disc structures for information recording having an air sandwich structure produced from the conventional materials described above. Consequently, we found that in the formation of the aforesaid air sandwich structure, the means of connecting the disc and the sealing members and the selection of materials for them exert important influences on the performance of the resulting optical information recording disc structure; and that if a heat-curable or ultraviolet-curable adhesive is used as the connecting means, the monomer components of the adhesive and by-products occurring during curing migrate into the air space to adversely affect the optical recording thin layers, or the adhesive bulges out to directly affect the optical recording thin layers. It has also been found that if the connection of the discs and sealing members formed of the conventional materials is effected by melt-adhesion induced by applying ultrasonic waves in an attempt to avoid such a trouble, the discs have an undesirably large birefringence because the aforesaid conventional materials have a high photoelastic constant and the melt adhesion causes the occurrence of a residual stress, and the resulting optical disc structure encounters troubles in use.

The present inventors furthered their investigation in order to provide an optical information recording disc structure having an air sandwich structure formed by ultrasonicating melt-adhesion which can overcome the aforesaid new technical problems.

These further investigations have now led to the discovery that the aforesaid new technical problems can be overcome completely by forming the sealing members and discs from the ethylene copolymer meeting the requirements (I) and (II) specified in the present invention and forming the air sandwich structure by the ultrasonicating melt-adhesion method, and there can be produced an optical information recording disc structure which is excellent in various properties such as thermal resistance, moisture or water resistance, chemical resistance, moldability, dimensional accuracy and optical properties and is not likely to undergo undesirable changes in optical properties such as an increase in birefringence owing to ultrasonicating melt-adhesion.

The copolymer of ethylene with the comonomer of formula (1) which is specified in the requirement (I) and forms the units represented by formula (2) and a method of its production are known per se, and are disclosed in detail in, for example, European Laid-Open Patent Publication No. 156,461 published on Oct. 2, 1985 (corresponding to U.S. Pat. No. 4,614,778 issued on Sept. 30, 1986). This European patent document generally states that such a copolymer has excellent transparency and a well balanced combination of heat resistance, heat aging resistance, chemical and solvent resistance, dielectric properties and mechanical properties such as rigidity, and can be used as a transparent resin in various fields including an optical field as optical lenses, optical discs, optical fibers and windowpanes.

The European patent document, however, does not at all refer to the aforesaid optical information recording disc structure having an air sandwich structure, much less the aforesaid new technical problems in the optical disc structure and the use of the above ethylene copolymer for solving these problems. Naturally, therefore, this European patent document quite fails to give a disclosure which can suggest that by using sealing members and discs formed from the ethylene copolymer meeting the requirements (I) and (II) specified in the present invention and providing the air sandwich structure by the ultrasonicating melt-adhesion method, the aforesaid new technical problems can all be solved, and an optical information recording disc structure having very good improved properties can be provided.

It is an object of this invention to provide an optical disc structure for information recording with an air sandwich structure having various good improved properties.

The above and other objects of this invention along with its advantages will become more apparent from the following description.

As shown in FIG. 1 in section, an optical disc structure for information recording comprising two discs 1,1' in the form of an annular coaxial plate having optical recording thin layers 2,2' on one surface, the discs being bonded, for example, by an adhesive or ultrasonication, via annular coaxial sealing members composed of an outer annular spacer 3 and an inner annular spacer 3' to form an air sandwich structure so that the optical recording thin layers face each other through an air space 4 is known, as stated hereinabove. The present invention pertains to an improvement in optical information recording disc structures having this basic structure and modified structures thereof.

The present invention is characterized in the aforesaid optical disc structure by the fact that (I) said sealing members and said discs are formed of a copolymer of ethylene with a comonomer represented by the following formula (1)

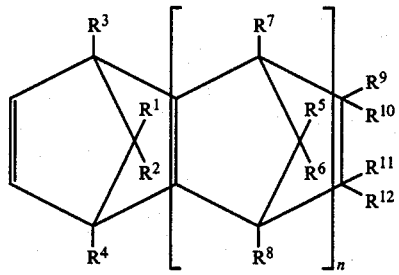
(1)

wherein R¹ to R¹² , independently from each other, represent a member selected from the class consisting of a hydrogen atom, halogen atoms and $C_1$-$C_4$ alkyl groups, R⁹ or R¹⁰ may be bonded to R¹¹ or R¹² to form a trimethylene or tetramethylene group, n represents zero or a positive number of 1, 2 or 3, and when n represents 2 or 3, two or three of each of R⁵ to R⁸ groups may be identical or different, and the comonomer of formula (1) forms units of the following formula (2) in the copolymer

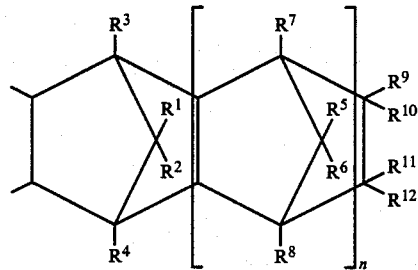
(2)

wherein R¹ to R¹² and n are as defined above, and (II) the ethylene copolymer (A) forming said sealing members has an ethylene content (a) of 55 to 80 mole %, the ethylene copolymer (B) forming the discs has an ethylene content (b) of 50 to 70 mole %, and (a)>(b).

Among comonomers represented by formula (1), those represented by the following formula (1)' are preferred in view of the ease with which they can be obtained or synthesized.

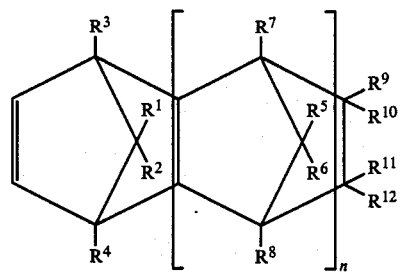
(1)' wherein R¹ to R¹², independently from each other, represent a member selected from the class consisting of a hydrogen atom and $C_1$-$C_4$ alkyl groups, provided that the total number of the alkyl groups is up to 4 and the rest are hydrogen atoms, and R⁹ or R¹⁰ may be bonded to R¹⁰ or R¹² to form a trimethylene or tetramethylene group [n=1 in formula (1)].

Specific examples of the comonomer (1) are shown below.

When n is 0 in formula (1):

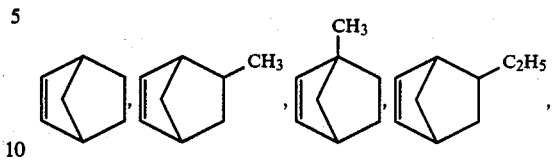

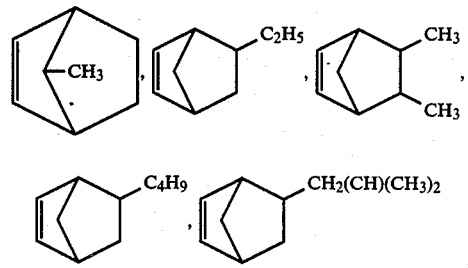

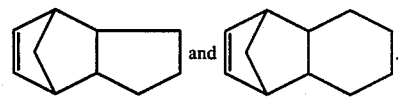

When n is 1 in formula (1):

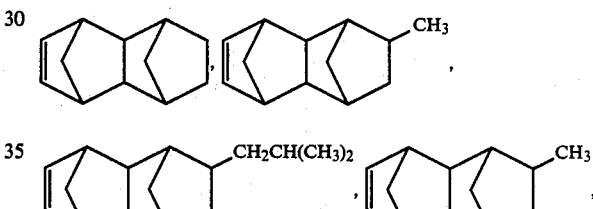

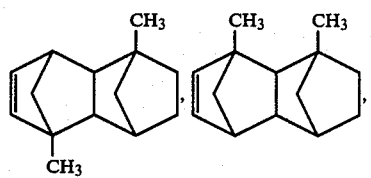

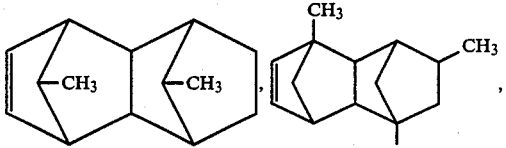

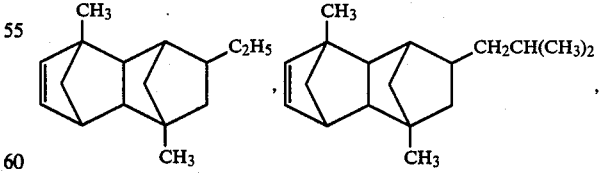

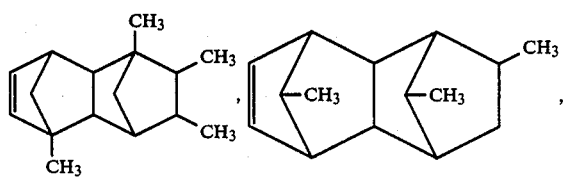

-continued

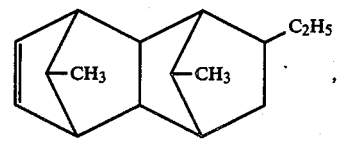

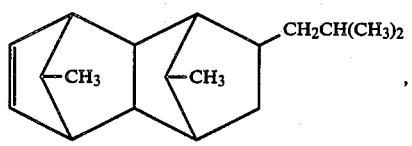

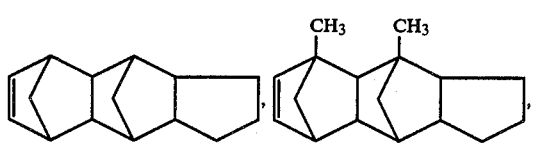

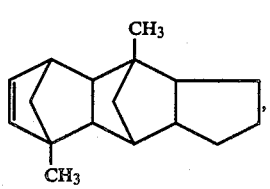

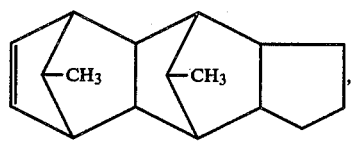

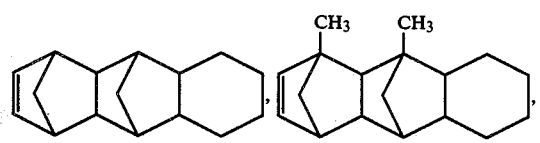

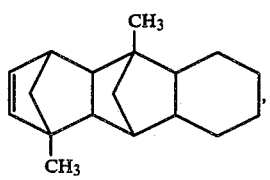

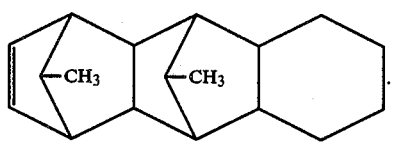

When n is 2 in formula (1):

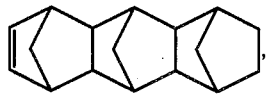

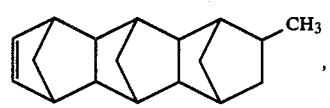

-continued

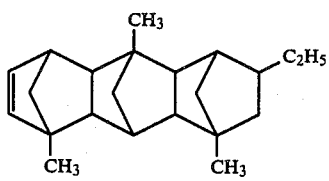

When n is 3 in formula (1):

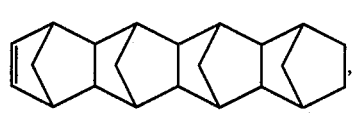

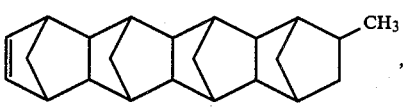

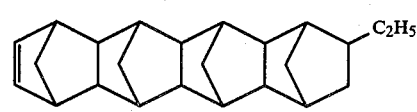

The compounds of formula (1) and methods for their synthesis are known, and disclosed, for example, in U.S. Pat. No. 3,557,072 (corresponding to Japanese Patent Publication No. 14910/1971), Japanese Laid-Open Patent Publication No. 154133/1982, and European Laid-Open Patent Publication No. 156,461 (corresponding to U.S. Pat. No. 4,614,778). These known compounds (1) and methods can be used in this invention.

In the present invention, sealing members and discs made of the copolymer of ethylene with the comonomer (1) as specified in requirement (I) are used. The copolymer may contain other copolymerizable monomers of the types and amounts which do not impair the purpose of improvement by the present invention. For example, up to about 5 mole %, per 100 mole % of ethylene and the comonomer of formula (1) combined, of another copolymerizable monomer selected from the group consisting of alphaolefins, cyclic olefins, polyenes and unsaturated carboxylic acids may be used. Specific examples of the other copolymerizable monomers included alpha-olefins having 3 to 20 carbon atoms, preferably 3 to 10 carbon atoms, such as propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, 1-hexadecene and 1-eicocene; cyclic olefins such as cyclopentene, cyclohexene, 3,4-dimethylcyclopentene, 3-methylcyclohexene, 2-(2-methylbutyl)-1-cyclohexene, styrene, and alphamethylstyrene; polyenes such as dicyclopentadiene, ethylidenenorbornene and vinylnorbornene; and unsaturated carboxylic acids such as maleic acid and maleic anhydride.

The copolymer of ethylene with the comonomer of formula (1) specified in requirement (I) and a method of its production are generally known per se, and disclosed in detail in, for example, the above-cited European Laid-Open Patent Publication No. 156,461 (corresponding to U.S. Pat. No. 4,614,778). They can also be used in this invention. Hence, a detailed description of these will be omitted in this specification. The ethylene copolymer used in this invention can be produced by copolymerizing ethylene with the comonomer of formula (1), if desired with another copolymerizable monomer, in a hydrocarbon medium for example, in the presence of a Ziegler-type catalyst composed of a vanadium catalyst component and an organoaluminum compound catalyst component at a temperatrure of, for example, $-20°$ to $60°$ C. under a pressure of, for example, about 1 to 5 kg/cm$^2$-G.

The comonomer (1) in the ethylene copolymer used in this invention forms the units represented by formula (2). The formation of these units can be determined by the fact that the resulting copolymer has an iodine number of not more than 5, in most cases not more than 1. The formation of the units of formula (2) can also be determined by $^{13}$C-NMR. For example, if it is assumed that tetracyclododecene assumes the structure

in a copolymer of ethylene and tetracyclododecene

it can be assumed that the copolymer assumes the following structures according to the presence of isomers of tetracyclododecene. At this time, chemical shifts of peaks at the invidividual carbons are as shown in the following table. The structure of the copolymer can be specified by determining peaks obtained by measuring it by $^{13}$C-NMR.

| (A) Chemical shifts of peaks (ppm) | (B) Assignment of the peaks (the position of carbon) |
|---|---|
| 54.4 | B-3 |
| 50.8 | A-3 |
| 45.7–48.8 | A-2, B-1, B-2 |
| 39.4–40.5 | A-1, B-4 |
| 36.9 | A-4 |
| 36.6–36.7 | A-7 |
| 35.6 | B-7 |
| 35.2 | A-7 |
| 31.7 | A-5 |
| 29.6–31.3 | ethylene unit B-5, B-6 |

The chemical shifts are based on TMS.

As specified in the requirement (II), the ethylene copolymer (A) forming the sealing members 3 and 3' and the copolymer (B) forming the discs 1 and 1' are different in ethylene content, and the ethylene content (a) of the ethylene copolymer (A) is larger than the ethylene content (b) of the ethylene copolymer (B). In particular, the ethylene content (a) of the copolymer (A) forming the sealing members 3 and 3' is 55 to 80 mole %, preferably 65 to 75 mole %, and the ethylene content (b) of the ethylene copolymer (B) forming the discs 1 and 1' is 50 to 70 mole %, preferably 55 to 65 mole %. Furthermore, (a)>(b), preferably (a)≧(b)+5.

By selecting sealing members 3 and 3' formed of the ethylene copolymer (A) and discs 1 and 1' formed of ethylene copolymer (B) and connecting them by ultrasonicating melt-adhesion, there can be obtained an optical information recording disc structure of an air sandwich structure having moderate cushioning property, namely impact strength, and excellent handlability. Furthermore, since the ethylene copolymers (A) and (B) have a low photoelastic constant and low photoelastic sensitivity, even the application of ultrasonicating welding in bonding the sealing members 3 and 3' to the discs 1 and 1' does not result in an increase in birefringence by residual stresses caused by the welding. Furthermore, since the sealing members 3 and 3' show moderate cushioning property, the residual stresses are absorbed and the variations of birefringence are further suppressed. Also, it is possible to prevent the sealing members which have a small width and thickness but a fairly large length from failing to withstand ultrasonic vibrations during the ultrasonicating welding and undergo cracking or breaking. If the annular spacers 3 and 3' are made of the ethylene copolymer having the same content as the ethylene copoloymer forming the discs 1 and 1', cracks may form in the spacers during the ultrasonicating welding, and the broken fragments may scatter and injure the recording layers.

Optical information recording disc structures having an air sandwich structure and modified structures thereof and methods of producing thereof utilizing the ultrasonicating welding method are described in detail, for example, in U.S. Pat. No. 4,074,282, Japanese Laid-Open Patent Publications Nos. 103537/1985 and 138750/1985, and "OPTRONICS" magazine, vol. 43

(1985), No. 7, pages 66–76 (published by Optronics Co., Ltd.), and can be utilized in this invention. For example, recording layers 2 and 2' of two discs 1 and 1' are placed face to face, and an outer annular spacer 3 and an inner annular spacer 3' are interposed between them so that they are located coaxially. The facing surfaces of the spacers 3 and 3' and the facing surfaces of the discs 1 and 1' are welded to each other by ultrasonicating welding. So long as the sealing members composed of the spacers 3 and 3' and the discs 1 and 1' are formed of the ethylene copolymers specified in requirements (I) and (II), there can be produced an optical information recording disc structure having a low birefringence and a high adhesion strength and is free from cracking or breaking can be produced.

In the foregoing description of the invention, both of the discs 1 and 1' have a recording layer. It will be obvious to those skilled in the art however that the invention can also be applied to the type of disc structure in which only one of the discs has a recording layer. This embodiment is also within the scope of the invention.

The sequence of ultrasonicating welding of the discs 1 and 1' to the sealing members composed of an outer annular spacer 3 and an inner annular spacer 3' can be selected as desired. For example, it is possible to weld the outer spacer to one of the discs, then weld the inner spacer to the disc which has been welded to the outer spacer as above and to the other facing disc simultaneously from one direction, and thereafter weld the outer spacer to the non-welded portion of the disc. Alternatively, the outer spacer is welded to one of the disc plates, and the inner spacer is combined with the other disc, and welding of the inner spacer to the two discs and welding of the outer spacer to the non-welded portions of the one disc plate are performed simultaneously. It is also possible to weld the outer spacer and the inner spacer to one disc, then combine the other disc and weld it to the non-welded portions of the outer spacer and the inner spacer.

The dimension of the optical disc structure of the invention which can be produced by known methods as above can be properly selected by those skilled in the art. For example, each disc plate has an outside diameter of 130 mm, an inside diameter of 15 mm and a thickness of 1.2 mm. The outer spacer has an outside diameter of 130 mm, an inside diameter of 125 mm and a thickness of about 0.4 mm. The inner spacer has an outside diameter of 36 mm, an inside diameter of 15 mm and a thickness of about 0.4 mm. Protrusions may be provided in the spacers as shown in Japanese Laid-Open Patent Publication No. 103537/1985 to facilitate the ultrasonicating welding. The outside diameters of the disc may be otherwise, for example, 60 mm, 90 mm, 200 mm, 300 mm, etc. The size of the spacers can be varied properly according to the changes of the outside diameter of the discs.

The following examples illustrate the present invention more specifically.

In these examples, the following test methods were used.

(1) Photoelastic constant

The birefringence of a test piece (10×100×0.5 mm) obtained by press forming was measured under no load or by applying a stress to the test piece by suspending a weight of 50 g, 100 g or 200 g from the sample, and the photoelastic constant of the sample was calculated from the birefringence. The birefringence was measured by using a transmission-type ellipsometer using He-Ne laser having a λ of 632.8 mm as a light source.

(2) Double-pass optical retardation

Calculated as (birefringence×thickness of the test sample)×2.

(3) Falling test

The optical disc structure was lifted vertically and let fall spontaneously onto a concrete floor from a position where the center of the disc structure was 1 meter above the concrete floor. The melt-adhered surface between the spacers and the discs was observed.

A sample in which the spacer and the disc were delaminated at the melt-adhered surface in the nth falling is evaluated as "n". A sample in which the disc itself broke in the nth falling without delamination at the melt-adhered surface is evaluated as "n broken".

(4) Supporting test

That part of the optical disc structure which extends along the inner spacer was fixed, and a point in the melt-adhered surface between the outer spacer and the disc was pushed by a rod to a depth of 2 mm to bent the optical disc structure to determine whether the melt-adhered portion delaminated. Furthermore, that part of the disc structure which extended along the outer spacer was fixed, and one point in the melt-adhered surface between the inner spacer and the disc was pushed by a rod in the same way to determine the state of the melt-adhered portion. This test was conducted at four points in a crisscross direction on the side of the outer spacer, and at four points in a crisscross direction on the side of the inner spacer. If delamination occurred in any one point, the evaluation was X. If no delamination occurred in any of the eight points, the evaluation was ○.

(5) Tensile test

The tensile strength of the outer spacer portion of the optical disc structure was measured at a cross head speed of 50 mm/min. by using an Instron universal tester.

(6) Flatness

A He-Ne laser beam was irradiated onto a site 27 to 59 mm from the center of the disc structure in a direction at right angles to the surface of the disc structure. The angle of the reflecting light ray was measured in radian and expressed by the following rating index. When the rating index is F or G, the optical disc structure can be used without influences on its performance.

A>10 (m radian), 10≧B>8.75, 8.75≧C>7.5, 7.5≧D>6.25, 6.25≧E>5, 5≧F>3.75, 3.75≧G.

EXAMPLES 1-3

The photoelastic constants of an ethylene/tetracyclododecene copolymer having an ethylene content of 60 mole % (it was determined by $^{13}$C-NMR that tetracyclododecene in the copolymer assumed the structure

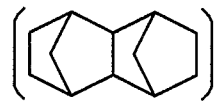

and polymethyl methacrylate (T10-10, a product of Kyowa Gas Chemical Industry Co., Ltd.) and polycarbonate (AD-503, Teijin Chemical Co., Ltd.) were measured. The results are shown in Table 1.

The irradiation angle of laser light in a direction at right angles to the optical disc structure was assumed to be 0 degree, and varied by every 10 degrees. The double-pass optical retardation at this time as measured at a point γ mm from the center of the optical disc structure. The results are shown in Table 1.

The results demonstrate that the ethylene copolymer used in this invention has a low photoelastic constant and hardly undergoes optical influences even when a bonding method tending to generate residual stresses, such as ultrasonicating melt-adhesion is used. On the other hand, it is seen that polycarbonate has a high photoelastic constant, and when it is subjected to the ultrasonicating melt-adhesion, optical strains occur and it cannot be used as an optical disc. It is also seen that polymethyl methacrylate having nearly the same photoelastic constant showed changes in birefringence according to changes in the incidence angle of the laser beam. Accordingly, it is seen that polymethyl methacrylate has inferior performance to the polymer used in this invention in an optical disc application in which laser beams are focused on the disc in order to write or read information by the laser beams.

TABLE 1

| Example | Polymer | Photo-elastic constant | γ (mm) | Double-pass optical retardation | | | | |
|---|---|---|---|---|---|---|---|---|
| | | | | 0° | 10° | 20° | 30° | 40° |
| 1 | Ethylene/tetra-cyclododecene copolymer | $-6 \times 10^{-7}$ | 27 | +18 | +18 | +19 | +19 | +20 |
| | | | 43 | +13 | +14 | +15 | +15 | +17 |
| | | | 58 | +7 | +8 | +8 | +9 | +10 |
| 2 | Poly(methyl methacrylate) | $-6 \times 10^{-7}$ | 25 | −9 | −9 | −13 | −16 | −18 |
| | | | 42 | −1 | −2 | −5 | −9 | −13 |
| | | | 56 | +4 | +2 | ±0 | −5 | −9 |
| 3 | Polycarbonate | $80 \times 10^{-7}$ | 30 | +11 | +35 | +56 | +118 | +147 |
| | | | 43 | +16 | +46 | +74 | +138 | +169 |
| | | | 58 | +12 | +48 | +89 | +163 | +206 |

EXAMPLES 4–7

In each run, two discs having a diameter of 130 mm and a thickness of 1.2 mm, an outer annular spacer having an outside diameter of 130 mm, an inside diameter of 125 mm and a thickness of about 0.4 mm, and an inner annular spacer having an outside diameter of 36 mm, an inside diameter of 15 mm and a thickness of about 0.4 mm were made from each of the ethylene/tetracyclododecene copolymers shown in Table 4. Using these materials, an optical information recording disc structure having an air sandwich structure was produced by ultrasonication melt-adhesion. Specifically, (1) the outer spacer was melt-adhered to one disc by ultrasonication. (2) Then, the disc to which the outer spacer was melt-adhered was melt-adhered by ultrasonication to the other disc via the inner spacer. (3) The outer spacer was melt-adhered by ultrasonication to the non-adhered portion of the other disc. The melt-adhering conditions are shown in Table 2. The results are shown in Table 4.

TABLE 2

| | Output (KW) | Oscillating time (sec) | Holding pressure (kg/cm²) |
|---|---|---|---|
| (1) | 0.8 | 0.05 | 0.7 |
| (2) | 0.5 | 0.05 | 0.7 |
| (3) | 0.8 | 0.05 | 2 |

EXAMPLES 8–12

In each run, an optical information recording disc structure was produced by ultrasonicating melt-adhesion as in Example 4 (the copolymer used to produce the discs in Example 12 was an ethylene/methyltetracyclododecene copolymer). The ultrasonicating melt-adhesion was carried out as follows:

(1) The outer spacer was melt-adhered by ultrasonication to one disc.

(2) Melt-adhesion of the non-adhered portion of the outer spacer to the other disc and melt-adhesion of the inner spacer to the two discs were simultaneously carried out by ultrasonication.

The melt-adhesion conditions are shown in Table 3. The results are shown in Table 4.

TABLE 3

| | Output (KW) | Oscillating time (sec) | Holding pressure (kg/cm²) |
|---|---|---|---|
| (1) | 2.4 | 0.43 | 1.3 |
| (2) | 2.4 | 1.13 | 1.3 |

TABLE 4

| | Copolymer for the discs | | Copolymer for the spacers | | Melt-adhered state | | | | |
|---|---|---|---|---|---|---|---|---|---|
| Example | Ethylene (mole %) | Comonomer | Ethylene (mole %) | Comonomer | Falling test | Supporting test | Tensile strength (kg/cm) | Flatness | Remarks |
| 4 | 60 | TD¹ | 67.8 | TD | 2 broken | ○ | 5 | F | |
| 5 | " | " | 76.7 | " | " | ○ | 5 | F | |
| 6 | " | " | 91.1 | " | 1 | X | 1 | A | The outside appearance of the welded portion was not good. |
| 7 | " | " | 55 | " | 1 | X | 2 | B | Spacers broken and attacked the recording layer. |
| 8 | 62 | " | 72 | " | 2 broken | ○ | 6 | G | |
| 9 | 63 | " | " | " | " | ○ | 7 | G | |
| 10 | 64 | " | " | " | " | ○ | 6 | G | |
| 11 | 63 | " | 66 | " | " | ○ | 4 | G | |

TABLE 4-continued

| | Copolymer for the discs | | Copolymer for the spacers | | Melt-adhered state | | | | |
|---|---|---|---|---|---|---|---|---|---|
| | | | | | | | Tensile | | |
| | Ethylene | | Ethylene | | Falling | Support- | strength | Flat- | |
| Example | (mole %) | Comonomer | (mole %) | Comonomer | test | ing test | (kg/cm) | ness | Remarks |
| 12 | 70 | M TD[2] | 73 | TD | " | ○ | 5 | F | |

[1]TD

[2]M TD

These results show that the optical information recording disc structures of this invention have excellent melt-adhered state and flatness, and that particularly when the copolymer having an ethylene content at least 5 mole % higher than the ethylene content of the copolyer constituting the discs is used to produce the annular spacers, the resulting disc structure had excellent melt-adhesion strength and flatness. If the ethylene content of the spacers differs from that of the discs by less than 5 moles % but is high, the resulting disc structure has a quality sufficiently withstanding practical use.

What is claimed is:

1. In an optical disc structure for information recording comprising two discs in the form of an annular coaxial plate having optical recording thin layers on one surface thereof, said discs being melt-adhered by ultrasonication via annular coaxial sealing members composed of an outer annular spacer and an inner annular spacer to form an air sandwich structure so that the optical recording thin layers face each other through an air space, provided that one of the optical recording thin layers may be omitted, an improvement wherein (I) said sealing members and said discs are formed of a copolymer of ethylene with a comonomer represented by the following formula (1)

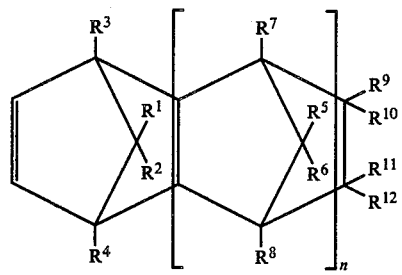

(1)

wherein $R^1$ to $R^{12}$, independently from each other, represent a member selected from the class consisting of a hydrogen atom, halogen atoms and $C_1$-$C_4$ alkyl groups, $R^9$ or $R^{10}$ may be bonded to $R^{11}$ or $R^{12}$ to form a trimethylene or tetramethylene group, n represents zero or a positive number of 1, 2 or 3, and when n represents 2 or 3, two or three of each of $R^5$ to $R^8$ groups may be identical or different, and the comonomer of formula (1) forms units of the following formula (2) in the copolymer

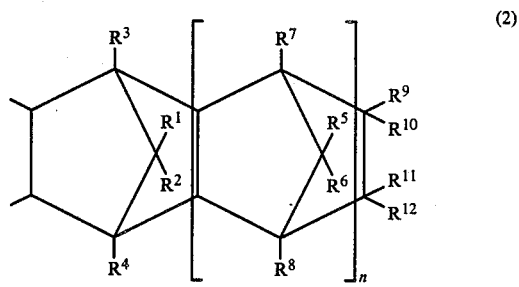

(2)

wherein $R^1$ to $R^{12}$ and n are as defined above, and (II) the ethylene copolymer (A) forming said sealing members has an ethylene content (a) of 55 to 80 mole %, the ethylene copolymer (B) forming the discs has an ethylene content (b) of 50 to 70 mole %, and (a)>(b).

2. The structure of claim 1 wherein in formulae (1) and (2), n is 1, and $R^1$ to $R^{12}$, independently from each other, represent a member selected from the class consisting of a hydrogen atom and $C_1$-$C_4$ alkyl groups, provided that the total number of the alkyl groups is up to 4 and the rest are hydrogen atoms.

3. The structure of claim 1 wherein the ethylene copolymer (A) has an ethylene content (a) of 65 to 75 mole %, the ethylene copolymer (B) has an ethylene content (b) of 55 to 65 mole %, and (a)≧(b)+5.

* * * * *